US00RE37526E

(19) United States
(12) Reissued Patent
Flint et al.

(10) Patent Number: US RE37,526 E
(45) Date of Reissued Patent: Jan. 22, 2002

(54) PROCESS FOR MAKING HIGH DENIER FILAMENTS OF THERMOTROPIC LIQUID CRYSTALLINE POLYMERS AND COMPOSITIONS THEREOF

(75) Inventors: John Anthony Flint, Berkeley Heights; Michael Jaffe, Maplewood, both of NJ (US); M. Ishaq Haider, Mooresville, NC (US); Joseph J. DiBiase, Nazareth, PA (US); John Edward Cornetta, Missouri City, TX (US)

(73) Assignee: Celanese Acetate LLC, Charlotte, NC (US)

(21) Appl. No.: 09/416,199

(22) Filed: Oct. 8, 1999

Related U.S. Patent Documents

Reissue of:
(64) Patent No.: 5,945,216
Issued: Aug. 31, 1999
Appl. No.: 09/150,853
Filed: Sep. 10, 1998

(51) Int. Cl.[7] ..... B32B 9/00
(52) U.S. Cl. ..... 428/364; 264/345; 428/392; 428/395
(58) Field of Search ..... 428/364, 392, 428/395; 264/345

(56) References Cited

U.S. PATENT DOCUMENTS

| | | | | |
|---|---|---|---|---|
| 4,183,895 A | 1/1980 | Luise | ..... | 264/345 |
| 4,468,364 A | 8/1984 | Ide | ..... | 264/176 R |
| 4,910,057 A | 3/1990 | Ide et al. | ..... | 428/36.9 |
| 5,246,776 A | 9/1993 | Meraldi et al. | ..... | 428/364 |
| 5,427,165 A | 6/1995 | Balestra et al. | ..... | 152/450 |

FOREIGN PATENT DOCUMENTS

JP 4-333616 11/1992

OTHER PUBLICATIONS

J. Rheology 1992, vol. 36 (p. 1057–178).
J. Appl. Polym. Sci. 1995, vol. 55 (p. 1489–1493).

*Primary Examiner*—Terressa M. Boykin
(74) *Attorney, Agent, or Firm*—Walter M. Douglas

(57) ABSTRACT

The present invention discloses and claims a novel process for the formation of high denier as-spun and heat-treated filaments of a thermotropic liquid crystalline polymer. Preferred embodiments include process for the formation of as-spun and heat treated monofilaments of a few wholly aromatic polyesters and polyesteramides. The process involves (a) heating of a thermotropic liquid crystalline polymer to above its melting transition temperature; (b) passing said molten polymer through an extrusion chamber equipped with an extrusion capillary of an aspect ratio of greater than about 1 and less than about 15 to form a filament; and (c) winding the filament at a draw-down ratio of at least about 4. The filaments so formed are of at least 50 denier per filament (dpf) and feature essentially uniform molecular orientation across the cross-section. In a final optional step, the filaments are heat treated in stages to form filaments exhibiting excellent tensile properties. Both as-spun and heat-treated filaments feature remarkably good tensile properties retaining at least 80 to 90 percent of the properties expected of conventional low denier (5 to 10 dpf) filaments.

47 Claims, No Drawings

PROCESS FOR MAKING HIGH DENIER FILAMENTS OF THERMOTROPIC LIQUID CRYSTALLINE POLYMERS AND COMPOSITIONS THEREOF

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to processes for forming filaments of a thermotropic liquid crystalline polymer. Specifically, the present invention provides processes for forming as-spun and heat-treated high denier filaments of a variety of thermotropic liquid crystalline wholly aromatic polyesters and polyesteramides. This invention also relates to as-spun and heat-treated high denier filaments of thermotropic liquid crystalline polyesters and polyesteramides.

2. Description of the Prior Art

Thermotropic liquid crystalline polymers (LCPs) are an important class of polymers, which are generally wholly aromatic molecules containing a variety of heteroatom linkages including ester and/or esteramide linkages. Upon heating to sufficiently high temperature, LCPs melt to form a liquid crystalline melt phase (often referred to as "anisotropic phase") rather than an isotropic melt. Generally, LCPs consist of linear ("rigid rod") molecules that can line up to yield the desired liquid crystalline order. As a result, LCPs feature low melt viscosity and thus improved performance and processabilities.

Because LCPs orient to form "rigid rod" linear molecules, LCPs exhibit extremely high mechanical properties. Thus, it is well known in the art that LCPs can be formed into shaped articles, such as films, rods, pipes, fibers, and various other molded articles. In addition, it is also known in the art that LCPs, particularly in the fiber form, exhibit exceptionally high mechanical properties after a heat treatment process. However, all of the known methods in the art describe formation of only the low denier fibers, e.g., of about 10 deniers per filament (dpf), which exhibit high mechanical properties in their as-spun as well as heat-treated forms.

Thus it is an object of the present invention to provide a process for forming uniformly oriented high denier LCP filaments. The high denier filament means a filament of higher than 50 dpf It is also an object of the present invention to provide a process for forming high denier LCP filaments of higher than 50 dpf, which exhibit enhanced mechanical, thermal and chemical resistance properties in the as-spun as well as heat-treated form.

It is further an object of the present invention to provide a process for forming high denier LCP filaments, which exhibit properties comparable to those of low denier LCP filaments (i.e., filaments of less than 10 dpf) in their as-spun as well as heat treated states.

It is also an object of the present invention to provide high denier LCP filaments of higher than 50 dpf having properties comparable to those of low denier LCP filaments of less than 10 dpf Finally, it is an object of the present invention to provide a cost-effective, industrially economic way to heat-treat the high denier filaments of this invention directly on the bobbin to produce high denier filaments of superior mechanical and physical properties.

There is high desirability in forming uniformly oriented high denier LCP filaments, which exhibit enhanced mechanical, thermal and chemical resistance properties in the as-spun as well as heat-treated form. For example, high denier LCP filaments can replace steel wires in steel belted tires. Furthermore, since LCP filaments are of substantially lower density when compared with steel wires, LCP filaments are expected to feature much superior properties than that exhibited by the steel wires. It is further obvious from the following prior art that there is a real need for high denier LCP filaments that exhibit enhanced mechanical, thermal, and chemical resistance properties.

Prior Art

The following references are disclosed as background prior art.

U.S. Pat. No. 4,183,895 describes a process for treating anisotropic melt forming polymeric products. A process of heat treatment obtained the fibers having enhanced mechanical properties and the fiber tenacity was increased by at least 50% and to at least 10 grams per denier.

U.S. Pat. No. 4,468,364 teaches a process for extruding thermotropic liquid crystalline polymers (LCPs). It is claimed that extrusion of an LCP through a die orifice having an L/D ratio of less than 2 (preferably 0), and at a draw-down ratio of less than 4 (preferably 1), one can obtain filaments featuring high mechanical properties.

U.S. Pat. No. 4,910,057 describes a highly elongated member of substantially uniform cross-sectional configuration, which is capable of improved service as a stiffening support in an optical fiber cable.

U.S. Pat. No. 5,246,776 teaches an aramide monofilament and method of making the same.

U.S. Pat. No. 5,427,165 describes a reinforcement assemblage formed at least in part of continuous monofilaments of liquid crystal organic polymer(s). The polymers used therein are primarily aramids.

Japanese laid open Patent No. 4-333616 teaches a method of manufacturing filaments of 50 to 2000 dpf from molten liquid crystalline polymers. The heat-treated mechanical properties of these filaments were significantly inferior than the properties reported for the corresponding lower denier filaments of 5 to 10 dpf.

J. Rheology 1992, Vol. 36 (p. 1057–1078) reports a study of the rheology and orientation behavior of a thermotropic liquid crystalline polyester using capillary dies of different aspect ratios.

J. Appl. Polym. Sci. 1995, Vol. 55 (p. 1489–1493) reports orientation distribution in extruded rods of a thermotropic liquid crystalline polyesters. The orientation function increases with increasing apparent shear rate from 166 to 270 $sect^{-1}$, but decreases with increasing apparent shear rate from 566 to 780 $sec^{-1}$.

All of the references described herein are incorporated herein by reference in their entirety.

SUMMARY OF THE INVENTION

Unexpectedly and surprisingly it has now been found that both as-spun and heat-treated high denier filaments of at least 50 denier per filaments can be made that feature essentially uniform molecular orientation across the cross-section. Furthermore, these high denier filaments feature remarkably good tensile properties retaining at least 80 to 90 percent of the properties expected of conventional low denier—5 to 10 dpf-filaments, which was hitherto unattainable by any of the known prior art references as briefly described hereinabove.

Thus, in accordance with this invention there is provided a process for forming an as spun filament of a thermotropic liquid crystalline polymer having the following properties:

(i) denier of at least about 50 denier per filament;

(ii) tenacity of at least about 8 grams per denier;

(iii) modulus of at least about 450 grams per denier; and (iv) elongation of at least about 2 percent.

The process of the present invention is comprised of the following steps:

(a) heating a thermotropic liquid crystalline polymer to a temperature of at least about 15° C. above its melting transition to form a fluid stream of said thermotropic polymer;

(b) passing said stream through a heated extrusion chamber, wherein said chamber is disposed with a suitable cylindrical orifice to form the filament of said polymer, and wherein said cylindrical orifice has an aspect ratio of length to diameter (L/D) greater than about 1 and less than about 15; and (c) winding said filament at a take-up speed of at least about 200 meters per minute and draw-down (DD) ratio of at least about 4; and with the proviso that when L/D is between 0 to 2, the DD is at least 4 so as to form the filament of essentially uniform molecular orientation across its cross-section and having a denier of at least about 50 denier per filament.

In another aspect of the invention there is also provided a process for forming a heat-treated filament of a thermotropic liquid crystalline polymer having the following properties:

(i) denier of at least about 50 denier per filament;

(ii) tenacity of at least about 20 grams per denier;

(iii) modulus of at least about 600 grams per denier; and (iv) elongation of at least about 3 percent.

Thus in accordance with this aspect of the present invention, the process is comprised of the following steps:

(a) heating a thermotropic liquid crystalline polymer to a temperature of about 15° C. to about 50° C. above its melting transition to form a fluid stream of said polymer;

(b) extruding said stream of polymer through a heated cylindrical spinneret having at least one extrusion capillary to form a filament, wherein said capillary has an aspect ratio of length to diameter (L/D) in the range of from about 1 to about 10;

(c) winding said filament at a take-up speed of at least about 200 meters per minute and draw-down ratio of from about 5 to about 40 so as to form a filament of essentially uniform molecular orientation across the cross-section and having a denier in the range of from about 50 to about 1000 denier per filament; and (d) heat-treating said filament at suitable temperature and pressure conditions for a sufficient period of time, optionally in the presence of an inert atmosphere, to form the heat-treated filament.

In yet another aspect of this invention there is also provided an as-spun filament of a thermotropic liquid crystalline polymer.

In a further aspect of this invention there is also provided a heat-treated filament of a thermotropic liquid crystalline polymer.

In another facet of this invention there is also provided a process for heat treating the high denier filaments of this invention directly on the bobbin on which they were wound while spinning.

Other aspects and advantages of the present invention are described further in the following detailed description of the preferred embodiments thereof.

Examples of the aromatic-aliphatic polyesters and polyesteramides which may be used in practicing the invention may include those having the following structures.

I is

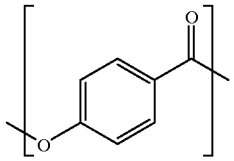

II is

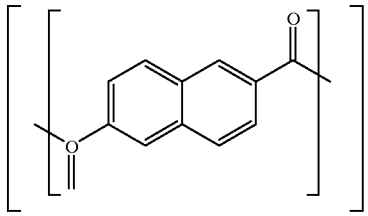

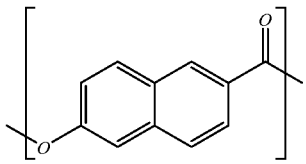

III is

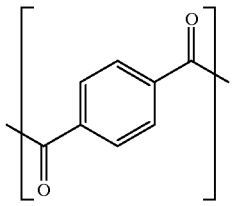

IV is

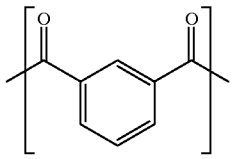

V is

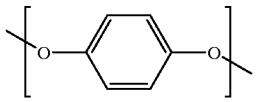

VI is

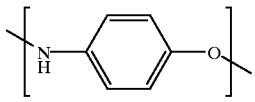

and

VII is

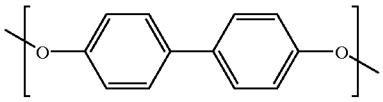

DETAILED DESCRIPTION OF THE INVENTION

In accordance with this invention there is provided a process for forming a filament of a thermotropic liquid crystalline polymer having the following properties:

(i) denier of at least about 50 denier per filament;

(ii) tenacity of at least about 8 grams per denier;

(iii) modulus of at least about 450 grams per denier; and (iv) elongation of at least about 2 percent.

The process of the present invention is comprised of the following steps:

(a) heating a thermotropic liquid crystalline polymer to a temperature of at least about 15° C. above its melting transition to form a fluid stream of said thermotropic polymer;

(b) passing said stream through a heated extrusion chamber, wherein said chamber is disposed with a suitable cylindrical orifice to form the filament of said polymer, and wherein said cylindrical orifice has an aspect ratio of length to diameter (L/D) greater than about 1 and less than about 15; and (c) winding said filament at a take-up speed of at least about 200 meters per minute and draw-down (DD) ratio of at least about 4; and with the proviso that when L/D is between 0 to about 2, the DD is at least 4 so as to form the filament of essentially uniform molecular orientation across its cross-section and having a denier of at least about 50 denier per filament.

As discussed hereinabove, prior art references disclose various processes for the manufacture of filaments of thermotropic polymers, including high denier filaments. A specific example of a method to prepare high denier filaments is disclosed in U.S. Pat. No. 4,468,364, which is incorporated herein by reference in its entirety. In this work, the thermotropic polymers were extruded from larger diameter jets at low draw-downs which automatically gave thicker filaments. The polymer melt was also extruded at low throughputs, i.e., speed of polymer in the jet, and taking the filaments up at low speed. This means that most of the orientation of the filament is obtained from the converging flow in the jet itself which explains why increasing the capillary length causes a reduction in orientation, i.e. orientation or filament modulus. Passage of the polymer through the capillary prior to exiting the jet will lead to disorientation of the flow which had been induced by the converging part of the jet above the capillary.

Unlike the process conditions of the prior art discussed hereinabove, the process of the present invention operates at higher draw-downs with the result that the filament undergoes elongation to decrease the filament diameter once it emerges from the jet orifice. This elongational flow puts most of the orientation into the filament, thus providing a filament having essentially uniform cross-sectional orientation.

Furthermore, the present invention also provides a commercially practical process in which the polymer throughput can be increased. Because the pressure over the jet will increase linearly with throughput, the pressure will reach impractical levels for small jets.

In accordance with the process of the present invention, the preferred polymers are thermotropic liquid crystalline polymers. Thermotropic liquid crystal polymers are polymers which are liquid crystalline (i.e., anisotropic) in the melt phase. Thermotropic liquid crystal polymers include wholly aromatic polyesters, aromatic-aliphatic polyesters, aromatic polyazomethines, aromatic polyesteramides, aromatic polyarmides, and aromatic polyester-carbonates. The aromatic polyesters are considered to be "wholly" aromatic in the sense that each moiety present in the polyester contributes at least one aromatic ring to the polymer backbone.

Specific examples of suitable aromatic-aliphatic polyesters are copolymers of polyethylene terephthalate and hydroxybenzoic acid as disclosed in Polyester X7G-A Self Reinforced Thermoplastic, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1–4. A further disclosure of such copolymer can be found in "Liquid Crystal Polymers: I. Preparation and Properties of p-Hydroxybenzoic Acid Copolymers," Journal of Polymer Science, Polymer Chemistry Edition, Vol. 14, pp. 2043–58 (1976), by W. J. Jackson, Jr. and H. F. Kuhfuss. The above-cited references are herein incorporated by reference in their entirety.

Aromatic polyazomethines and processes of preparing the same are disclosed in the U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrilo-2-methyl-1,4-phenylenenitriloethylidyne-1,4-phenyleneethylidyne); poly(nitrilo-2-methyl-1,4-phenylene-nitrilomethylidyne-1,4-phenylenemethylidyne); and poly(nitrilo-2-chloro-1,4-phenylenenitrilomethylidyne-1,4-phenylene-methylidyne).

Aromatic polyesteramides are disclosed in U.S. Pat. Nos. 5,204,443, 4,330,457, 4,966,956, 4,355,132, 4,339,375, 4,351,917 and 4,351,918. Each of these patents is herein incorporated by reference in its entirety. Specific examples of such polymers include polymer formed from the monomers comprising 4-hydroxybenzoic acid, 2,6-hydroxynaphthoic acid, terephthalic acid, 4,4'-biphenol, and 4-aminophenol; and polymer formed from the monomers comprising 4-hydroxybenzoic acid, 2,6-naphthalene dicarboxylic acid, terephthalic acid, isophthalic acid, hydroquinone, and 4-aminophenol.

Preferred aromatic polyamides are those which are melt processable and form thermotropic melt phase as described hereinabove. Specific examples of such polymers include polymer formed from the monomers comprising terephthalic acid, isophthalic acid, and 2,2'-bis(4-aminophenyl) propane.

Aromatic polyester-carbonates are disclosed in U.S. Pat. No. 4,107,143, which is herein incorporated by reference in its entirety. Examples of such polymers include those consisting essentially of hydroxybenzoic acid units, hydroquinone units, carbonate units, and aromatic carboxylic acid units.

The liquid crystal polymers which are preferred for use in the process of the present invention are the thermotropic wholly aromatic polyesters. Specific examples of such polymers may be found in U.S. Pat. Nos. 3,991,013; 3,991,014; 4,057,597, 4,066,620; 4,075,262; 4,118,372; 4,146,702; 4,153,779; 4,156,070; 4,159,365; 4,169,933; 4,181,792; and 4,188,476, and U.K. Application No. 2,002,404. Each of these patents is herein incorporated by reference in its entirety.

Wholly aromatic polyesters which are preferred for use in the present invention are disclosed in commonly-assigned U.S. Pat. Nos. 4,067,852; 4,083,829; 4,130,545; 4,161,470;

4,184,996; 4,238,599; 4,238,598; 4,230,817; 4,224,433; 4,219,461; and 4,256,624. The disclosures of all of the above-identified commonly-assigned U.S. patents and applications are herein incorporated by reference in their entirety. The wholly aromatic polyesters disclosed therein typically are capable of forming an anisotropic melt phase at a temperature below approximately 350° C.

The wholly aromatic polyesters which are suitable for use in the process of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants with the reaction continuing as solid polymer particles are suspended therein. A vacuum may be applied to facilitate removal of volatiles formed during the final stage of the condensation (e.g., acetic acid or water).

In commonly-assigned U.S. Pat. No. 4,083,829, entitled "Melt Processable Thermotropic Wholly Aromatic Polyester," is described a slurry polymerization process which may be employed to form the wholly aromatic polyesters which are preferred for use in the present invention. According to such a process, the solid product is suspended in a heat exchange medium. The disclosure of this patent has previously been incorporated herein by reference in its entirety.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided.

Representative catalysts which optionally may be employed in either the melt acidolysis procedure or in the slurry procedure of U.S. Pat. No. 4,083,829 include dialkyl tin oxide (for example, dibutyl tin oxide), diaryl tin oxide, titanium dioxide, antimony trioxide, alkoxy titanium silicates, titanium alkoxides, alkali and alkaline earth metal salts of carboxylic acids (for example, zinc acetate), gaseous acid catalysts such as Lewis acids (for example, $BF_3$), hydrogen halides (for example, HCl), and similar catalyst known to one skilled in the art. The quantity of catalyst utilized typically is about 0.001 to about 1 percent by weight based upon the total monomer weight, and most commonly about 0.01 to about 0.2 percent by weight.

The wholly aromatic polyesters which are preferred for use in the present invention commonly exhibit a weight average molecular weight of about 10,000 to about 200,000, and preferably about 20,000 to about 50,000, (for example, about 30,000 to about 40,000). Such molecular weight may be determined by commonly used techniques, such as, gel permeation chromatography or solution viscosity measurements. Other methods include end group determination via infrared spectroscopy on compression molded films or nuclear magnetic resonance spectroscopic (NMR) measurements of polymeric solutions or solid phase NMR of polymer powder or films. Alternatively, light scattering techniques in a pentafluorophenol solution may be employed to determine the molecular weight.

The wholly aromatic polyesters or polyesteramides additionally commonly exhibit an inherent viscosity (i.e., I.V.) of at least about 2.0 dL/g, for example, about 2.0 to about 10.0 dL/g, when dissolved in a concentration of 0.1 percent by weight in a 1:1 solvent mixture of hexafluoroisopropanol (HFIP)/pentafluorophenol (PFP) (v/v) at 25° C.

Especially preferred polymers for the process of this invention are wholly aromatic polyesters and polyesteramides. In preferred embodiments of this invention, specifically preferred polyesters are listed below:

a) The wholly aromatic polyester capable of forming an anisotropic melt phase at a temperature below approximately 350° C. consisting essentially of the recurring moieties I and II wherein:

I is

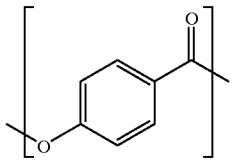

and

II is

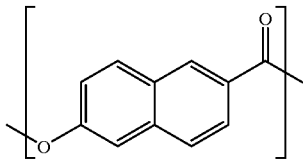

The wholly aromatic polyester as described above is disclosed in U.S. Pat. No. 4,161,470. The polyester comprises about 10 to about 90 mole percent of moiety I, and about 10 to about 90 mole percent of moiety II. In one embodiment, moiety II is present in a concentration of about 65 to about 85 mole percent, and preferably in a concentration of about 70 to about 80 mole percent; for example, about 75 mole percent. In another embodiment, moiety II is present in a lesser proportion of about 15 to about 35 mole percent, and preferably in a concentration of about 20 to about 30 mole percent.

b) The wholly aromatic polyester capable of forming an anisotropic melt phase at a temperature below approximately 400° C. consisting essentially of the recurring moieties I, II, III, and VII wherein:

I is

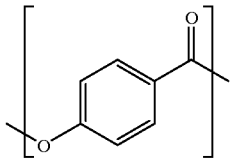

II is

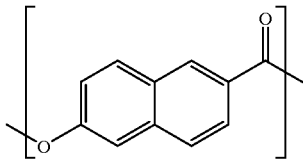

III is

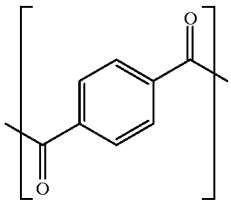

and
VII is

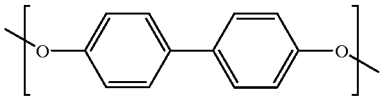

The polyester comprises about 40 to about 60 mole percent of moiety I, about 2 to about 30 mole percent of moiety II, and about 19 to about 29 mole percent each of moieties III and VII. In one of the preferred embodiments, the polyester comprises about 60 to about 70 mole percent of moiety I, about 3 to about 5 mole percent of moiety II, and about 12.5 to about 18.5 mole percent each of moieties III and VII.

The preferred polyesteramides of the process of the present invention are summarized below:

a) The wholly aromatic polyesteramide capable of forming an anisotropic melt phase at a temperature below approximately 360° C. consisting essentially of the recurring moieties II, [I] *III*, and VI wherein:

II is

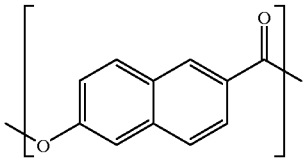

[I] *III* is

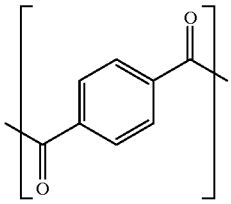

and
VI is

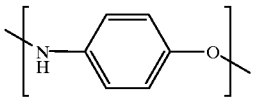

The wholly aromatic polyesteramide as described above is disclosed in U.S. Pat. No. 4,330,457, which is hereby incorporated herein by reference in its entirety. The polyesteramide comprises about 25 to about 75 mole percent of moiety II, about 37.5 to about 12.5 mole percent each of moieties [I] *III* and VI. The polyesteramide preferably comprises about 40 to about 70 mole percent of moiety II, and about 15 to about 30 mole percent each of moieties [I] *III* and VI. In one of the preferred embodiments of this invention, the polyesteramide comprises about 60 to about 65 mole percent of moiety II, and about 17.5 to about 20 mole percent each of moieties [I] *III*, and VI.

b) The wholly aromatic polyesteramide capable of forming an anisotropic melt phase at a temperature below approximately 380° C. consisting essentially of the recurring moieties I, II, III, VII and VI wherein:

I is

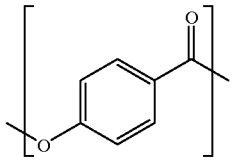

II is

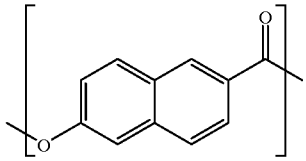

III is

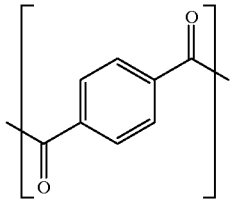

VII is

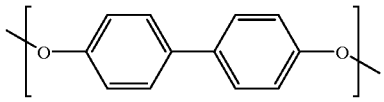

and
VI is

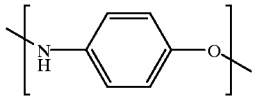

The wholly aromatic polyesteramide as described above is disclosed in U.S. Pat. No. 5,204,443, which is hereby incorporated herein by reference in its entirety. The polyesteramide comprises approximately 40 to 70 mole percent of moiety I, about 1 to about 20 mole percent of moiety II, about 14.5 to about 30 mole percent of moiety III, about 7 to about 27.5 mole percent of moiety VII, and about 2.5 to about 7.5 mole percent of moiety VI.

c) The wholly aromatic polyesteramide capable of forming an anisotropic melt phase at a temperature below approximately 350° C. consisting essentially of the recurring moieties I, II, III, IV, V, and VI wherein:

I is

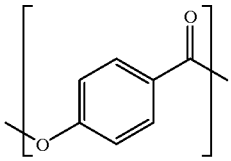

II is

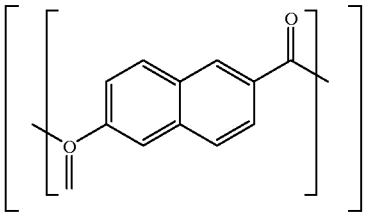

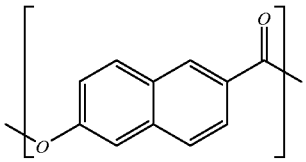

III is

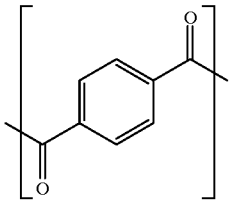

IV is

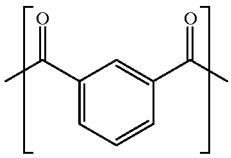

V is

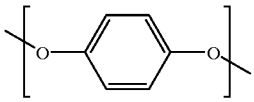

and

VI is

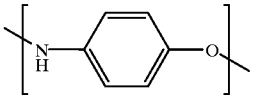

The polyesteramide as described above, comprises about 40 to about 70 mole percent of moiety 1, about 10 to about 20 mole percent of moiety II, about 2.5 to about 20 mole percent of moiety III, about 0 to about 3 mole percent of moiety IV, about 12.5 to about 27.5 mole percent of moiety V and about 2.5 to about 7.5 mole percent of moiety VI.

According to the process of the present invention, a fluid stream of liquid crystal polymer is provided to any conventional extrusion apparatus. This is achieved by heating the thermotropic liquid crystalline polymer of the present invention to form a melt. Any of the known methods to heat the polymer to form a melt can be employed in this invention. The particular apparatus used is not critical to the operation of the process of the present invention, and any suitable apparatus may be used herein. One such apparatus which has been found to be suitable for use with thermotropic liquid crystal polymers employs a contact melting method so that melt residence time can be kept short and constant. The apparatus includes a heated surface against which a molded rod of liquid crystal polymer is pressed. The fluid stream of molten polymer is then introduced to the extrusion chamber inside of which are disposed a filter pack and a cylindrical orifice. After being passed through the filter pack, the polymer melt is extruded through the cylindrical orifice.

In a preferred embodiment, the extrusion chamber is comprised of a single orifice cylindrical chamber in which the polymer is heated to a temperature in the range of about 20° C. to about 50° C. above its melting transition. In this preferred embodiment the cylindrical orifice having an aspect ratio (L/D) of about 1 to about 10 is employed. As used herein, the aspect ratio is meant to define the ratio of length (L) to diameter (D) of the cylindrical orifice. In a more preferred embodiment of this invention, the aspect ratio of the cylindrical orifice is in the range of about 1 to about 3.

After the fluid stream of the liquid crystal polymer is extruded through the orifice, the polymer forms an elongated shaped article having the polymer molecules oriented substantially parallel to the flow direction. The orientation of the polymer molecules can be confirmed by determining orientation angle by X-ray analysis. The extruded shaped articles in the form of filaments are then drawn-down and taken-up on a filament spool. In accordance with the process of this invention, it is critical that the appropriate draw-down ratio be used to exploit maximum benefit from the practice of this invention. Thus, in a preferred embodiment, the draw-down ratio in the range of from about 4 to about 20 is employed. In a more preferred embodiment, the draw-down ratio in the range of from about 4 to about 15 is employed. The draw-down ratio (DD) as used herein is defined as the ratio of cross-sectional area of the orifice ($A_1$) to the cross-sectional area of the filament ($A_2$). This ratio is often also expressed as the ratio of the take-up speed of the filament ($V_2$) to the extrusion speed of the filament ($V_1$). Thus the draw-down ratio, DD, may be expressed in terms of the following equation:

$$DD=A_1/A_2=V_2/V_1$$

Thus, in accordance with the process of the present invention, thermotropic liquid crystalline polymeric filaments having essentially uniform molecular orientation that exhibit unusually superior mechanical properties can be made. For example, by properly practicing the process of the present invention, it is now possible to obtain a high denier filament having hitherto unattainable properties. More specifically, it has now been found that filaments having a denier in the range of from about 100 to about 1000 denier per filament (dpf) can readily be made by following the process of this invention. In a preferred embodiment, filaments having a denier in the range of from about 150 to about 500 dpf can readily be made. In a more preferred embodiment, filaments having a denier in the range of from about 180 to about 300 dpf can readily be made. The denier as used herein is defined as a weight in grams of 9,000 meters of the filament. The dpf as used herein is the denier of an individual continuous filament.

The conditions of temperature and pressure under which the liquid crystal polymer can be extruded are not critical to the process of the present invention and can easily be determined by one of ordinary skill in the art. Typically, thermotropic polymers are extruded at a temperature of about 280° C. to about 400° C. and at a pressure of about 100 p.s.i. to about 5,000 p.s.i.

As discussed hereinabove, liquid crystal polymers have very stiff, rod-like molecules. In the quiescent state, the polymer molecules line up in local regions, thereby forming ordered arrays or domains. The existence of domain texture within the microstructure of a liquid crystal polymer may be confirmed by conventional polarized light techniques whereby a polarizing microscope utilizing crossed-polarizers is employed.

The mechanical properties of filaments produced in accordance with the process of the present invention can be improved still further by subjecting the articles to a heat treatment following extrusion. The articles may be thermally treated in an inert atmosphere (e.g., nitrogen, argon, helium). For instance, the article may be brought to a temperature about 10° C. to about 30° C. below the melting temperature of the liquid crystal polymer, at which temperature the filament remains as a solid object. The heat treatment times commonly range from a few minutes to a number of days, e.g., from about 0.5 to 200 hours, or more. Preferably, the heat treatment is conducted for a time of about 1 to about 48 hours (e.g., about 24 to about 30 hours). The heat treatment improves the properties of the article by increasing the molecular weight of the liquid crystalline polymer and increasing the degree of crystallinity.

Thus, in accordance with one of the preferred embodiments of the present invention there is also provided a process for forming a heat-treated filament of a thermotropic liquid crystalline polymer having the following properties:

(i) denier of at least about 50 denier per filament;

(ii) tenacity of at least about 20 grams per denier;

(iii) modulus of at least about 600 grams per denier; and (iv) elongation of at least about 3 percent.

The process for forming such a filament is comprised of the following steps:

(a) heating a thermotropic liquid crystalline polymer to a temperature of about 15° C. to about 50° C. above its melting transition to form a fluid stream of said polymer;

(b) extruding said stream of polymer through a heated cylindrical spinneret 20 having at least one extrusion capillary to form a filament, wherein said capillary has an aspect ratio of length to diameter (L/D) in the range of from about 1 to about 10;

(c) winding said filament at a take-up speed of at least about 200 meters per minute and draw-down ratio of from about 5 to about 40 so as to form a filament of essentially uniform molecular orientation across the cross-section and having a denier in the range of from about 50 to about 1000 denier per filament; and (d) heat-treating said filament at suitable temperature and pressure conditions for a sufficient period of time, optionally in the presence of an inert atmosphere, to form the heat-treated filament.

Any of the preferred thermotropic polyesters or polyesteramides described hereinabove may be used in this preferred embodiment. Further, as described herein, the heat treatment can be carried out in stages at a final temperature of about 15° C. below the melting transition of the thermotropic polymer.

In another preferred embodiment of this invention there is also provided an as-spun filament of a thermotropic liquid crystalline polymer having the following properties:

(a) denier of at least about 50 denier per filament;

(b) tenacity of at least about 8 grams per denier;

(c) modulus of at least about 450 grams per denier; and (d) elongation of at least about 2 percent.

In a particularly preferred embodiment of this invention the denier of as-spun filament is in the range of from about 100 to about 1000 dpf In a more particularly preferred embodiment of this invention the denier of as-spun filament is in the range of from about 150 to about 500 dpf. In a most particularly preferred embodiment of this invention the denier of as-spun filament is in the range of from about 180 to about 300 dpf.

In yet another preferred embodiment of this invention there is also provided a heat-treated filament of a thermotropic liquid crystalline polymer having the following properties:

(a) denier of at least about 50 denier per filament;

(b) tenacity of at least about 20 grams per denier;

(c) modulus of at least about 600 grams per denier; and (d) elongation of at least about 3 percent.

In a further aspect of this invention there is also provided a process for heat treating the high denier filaments produced in accordance of the process of this invention described hereinabove. In this aspect of the invention, the filaments wound on the bobbin are directly heat treated to obtain the heat-treated filaments, thus offering significant cost savings.

Thus, in accordance with this aspect of the invention, the process is comprised of the following steps:

(a) heating a thermotropic liquid crystalline polymer to a temperature of at least about 15° C. above its melting transition to form a fluid stream of said thermotropic polymer;

(b) passing said stream through a heated extrusion chamber, wherein said chamber is disposed with a suitable cylindrical orifice to form the filament of said polymer, and wherein said cylindrical orifice has an aspect ratio of length to diameter (L/D) greater than about 1 and less than about 15; and (c) winding said filament on to a bobbin at a low tension of at least about 5 grams and take-up speed of at least about 200 meters per minute and draw-down (DD) ratio of at least about 4 so as to form the filament of essentially uniform molecular orientation across its cross-section and having a denier of at least about 50 denier per filament; and (d) heat treating said filament directly on said bobbin at suitable temperature and pressure conditions for a sufficient period of time, optionally in the presence of an inert atmosphere, to form the heat treated filament.

Thus, by practicing this aspect of the present invention, it is now possible to obtain a heat-treated filament having the following properties:

(i) denier of at least about 50 denier per filament;

(ii) tenacity of at least about 20 grams per denier;

(iii) modulus of at least about 600 grams per denier; and (iv) elongation of at least about 3 percent.

Any of the thermotropic polymers described hereinabove may be used in this aspect of the invention. Preferred thermotropic polymers are the polyesters and polyesteramides as described hereinabove.

Surprisingly, it has now been found that applying low tension while winding the filament on to the bobbin markedly improves the tensile properties of the filaments after heat treatment. For example, tensions of about 5 grams to 30 grams appears to be essential. It is preferred that tensions of about 10 grams is applied to obtain maximum benefit from the practice of this invention.

This invention is further illustrated by the following examples, which are provided for illustration purposes and in no way limit the scope of the present invention.

EXAMPLES (GENERAL)

In the Examples that follow, the following abbreviations are used:

HBA=4-Hydroxybenzoic acid

HNA=2,6-Hydroxynaphthoic acid

TA=Terephthalic acid

IA=Isophthalic acid

NDA=2,6-Naphthalene dicarboxylic acid

BP=4,4'-Biphenol

HQ=Hydroquinone

AA=1-Acetoxy-4-acetamidobenzene

IV=Inherent viscosity dL/g=deciliters per gram; an unit of measure of IV wt. %=weight per cent; generally used to represent the concentration of a solution to measure IV—means grams of polymer in 100 mL of a solvent mixture.

MV=Melt viscosity

DSC=Differential Scanning Calorimetry

T=Tenacity

M=Modulus

E=Elongation gpd=grams per denier

General Analytical Techniques used for the Characterization of the Polymer

A variety of analytical techniques were used to characterize the polymer used and the filaments formed according to the present invention, which included the following:

IV: The solution viscosity of the polymer samples, IV, was measured at 25° C. in a concentration of 0.1 wt. % solution in equal parts by volume of pentafluorophenol and hexafluoroisopropanol.

MV: MV of polymer samples was measured using a Kayeness Melt Rheometer Model 2052 equipped with a Hastalloy barrel and plunger tip. The radius of the die orifice was 0.015 inch and the length was 1 inch. For the purpose of determining melt viscosity, a plot of viscosity vs. shear rate was generated by measuring the viscosities at shear rates of 56, 166, 944, 2388, and 8333 $sec^{-1}$, and viscosities at 100 and 1000 $sec^{-1}$ were interpolated.

DSC: DSC of polymer samples was performed on a Perkin Elmer 7700 Thermal Analysis System. In all runs the samples, sealed in aluminum pans, were heated or cooled at a rate of 20° C./min. under a nitrogen atmosphere. The DSC curves obtained from the second heating run were taken for the analysis.

Light Microscopy: Samples were prepared for microscopic analysis by thin sectioning using a glass knife microtome. The sections were examined by polarized light microscopy to observe morphological behavior at ambient temperatures.

Example 1

This Example 1 demonstrates the general increase in mechanical properties of an as-spun high denier filament of a liquid crystalline wholly aromatic polyester produced in accordance with the present invention, i.e., filaments formed from a die having an aspect ratio (L/D) higher than 2 and at a draw-down ratio (DD) equal to or higher than 4.

Filaments were formed from a thermotropic liquid crystalline wholly aromatic HBA/BA polyester sold under the tradename of "VECTRA™ A" (Ticona LLC, Summit, N.J.). This polymer exhibited a melting temperature of 280° C. and an inherent viscosity of 6.30 dL/g when measured in a concentration of 0.1 percent by weight solution in equal parts by volume of pentafluorophenol and hexafluoroisopropanol at 25° C.

A sample of the polymer was dried overnight at 130° C. under vacuum. The polymer was melted in a 1 inch diameter extruder, and the extrudate was metered using a conventional polymer meter pump to the spinning pack where it was filtered through 50/80 shattered metal. The melt was then extruded through a single hole spinneret of various aspect ratios (L/D) as listed in Table 1. Crossflow quench was applied to the emerging filament to provide cooling and a stable spinning environment. The quench was situated 4 cm below the spinneret face, and was 120 cm long by 15 cm wide. The quench flow rate at the top was 30 mpm (0.5 mpsec). The monofilament was dressed either with water or with a spinning finish before passing around a system of godets which controlled the take-up speed. It was finally taken up on a Sahm spool winder.

Mechanical properties of the monofilaments produced in accordance with this Example 1 were measured in accordance with ASTM D3822, and the results are listed in Table I. For purposes of comparison, monofilaments were also extruded in the manner described above with the exception that the DD ratios were maintained below 4. In a few of these comparative runs, spinnerets with low aspect ratios (L/D less than 2) were also used, as listed in Table I. Mechanical properties of these monofilaments were measured using the same procedures as described above and are also listed in Table I.

The data given in Table I indicate a dramatic improvement in properties of monofilaments extruded with spinnerets having aspect ratio (L/D) higher than 1 and DD ratio higher than 4 as compared to those of monofilaments extruded with spinnerets having aspect ratio (L/D) lower than 2 and at DD ratios lower than 4. This Example thus demonstrates the beneficial effects achieved by extruding liquid crystal polymer through a spinnerets having L/D higher than 2 at a draw-down ratio of higher than 4 in accordance with the process of the present invention.

Note: In all Tables herein, all samples were tested at 10-inch gauge length, 20% strain rate, 10 filament break.

TABLE I

| Sample No. | L/D | Draw-Down | Denier (g) | Tenacity (gpd) | Modulus (gpd) | Elongation (%) |
|---|---|---|---|---|---|---|
| 38592-46-1 | 0 | 56.5 | 239 | 5.7 | 466 | 1.4 |
| 39592-49-1 | 0 | 3.0 | 216 | 7.4 | 589 | 1.6 |
| 38445-37-7 | 1 | 6.2 | 219 | 9 | 615 | 1.8 |
| 38592-48-1 | 1 | 54.7 | 247 | 6.4 | 475 | 1.5 |
| 38664-1-1 | 1 | 6.4 | 225 | 10.2 | 597 | 2 |
| 38592-43-1 | 2 | 17.3 | 231 | 8.5 | 587 | 1.8 |
| 38592-45-1 | 10 | 57.0 | 237 | 6 | 533 | 1.4 |
| 38592-47-2 | 10 | 2.3 | 276 | 8.8 | 466 | 2.4 |

Example 2

Monofilaments produced in accordance with Example 1 were subjected to a heat treatment in stages as follows. Heat treatment of short lengths of the monofilament was carried out on racks under zero tension in a flow of dry nitrogen using a programmed temperature profile. The programmed temperature profiles of each of the heat treatment of monofilaments are listed in Table II. The heat-treated monofilament was tested at 10 inch gauge length; 20% strain rate and 10 filament break. Following heat treatment, the mechanical properties of the monofilaments were measured and are listed in Table II.

The measurements were made using the same tests as in Example 1. The data demonstrate the increase in properties, which is obtained by subjecting the monofilaments to staged heat treatment conditions.

TABLE II

| Sample Number | Preheat Condition | Heat Treatment Condition | Orifice Size (Draw-down) | Den. (g) | Ten. (gpd) | Mod. (gpd) | Elong. (%) |
|---|---|---|---|---|---|---|---|
| 38543-02-1 | 230° C./2 hr | 2 hr hold @ 270° C. | 0.015" (6.2) | 207 | 25.64 | 699 | 3.25 |
| 38543-02-3 | 230° C./2 hr | 8 hr hold @ 270° C. | 0.015" (6.2) | 211 | 25.64 | 690 | 3.31 |
| 38543-02-5 | 230° C./2 hr | 14 hr hold @ 270° C. | 0.015" (6.2) | 213 | 24.36 | 633 | 3.17 |
| 38543-03-1 | None | 2 hr hold @ 270° C. | 0.015" (6.2) | 211 | 21.69 | 621 | 3.03 |
| 38445-38-6 | None | As-Spun (Control) | 0.025" (17.1) | 205 | 10.1 | 593 | 1.88 |
| 38543-02-2 | 230° C./2 hr | 2 hr hold @ 270° C. | 0.025" (17.1) | 201 | 22.45 | 682 | 3.04 |
| 38543-02-4 | 230° C./2 hr | 8 hr hold @ 270° C. | 0.025" (17.1) | 203 | 24.76 | 641 | 3.25 |
| 38543-02-3 | 230° C./2 hr | 14 hr hold @ 270° C. | 0.025" (17.1) | 213 | 23.44 | 613 | 3.31 |
| 38543-03-2 | None | 2 hr hold @ 270° C. | 0.025" (17.1) | 200 | 18.12 | 586 | 2.78 |

Example 3

Examples 1 and 2 were repeated in this Example 3 except that the high denier filaments of Vectra A polymer were formed. The Table III summarizes the as-spun and heat-treated properties of the filaments.

TABLE III

| Sample Number | Heat Treatment Condition | Orifice Size (Draw-down) | Den. (g) | Ten. (gpd) | Mod. (gpd) | Elong. (%) |
|---|---|---|---|---|---|---|
| 38538-16-6 | As-Spun | 0.015" | 228 | 10.4 | 546 | 2.0 |
| 38543-09-1 | 230° C./2 hr; 270° C./2 hr | (6.2) | 228 | 22.3 | 608 | 3.2 |
| 38538-16-7 | As-Spun | 0.015" | 339 | 9.8 | 531 | 2.0 |
| 38543-09-2 | 230° C./2 hr; 270° C./2 hr | (6.2) | 334 | 18.8 | 625 | 2.5 |
| 38538-16-8 | As-Spun | 0.015" | 449 | 10.0 | 532 | 2.1 |
| 38543-09-3 | 230° C./2 hr; 270° C./2 hr | (6.2) | 439 | 17.1 | 583 | 2.7 |
| 38538-20-3 | As-Spun | 0.025" | 461 | 9.5 | 543 | 2.0 |
| 38543-09-4 | 230° C./2 hr; 270° C./2 hr | (17.1) | 454 | 18.5 | 648 | 2.8 |
| 38538-20-5 | As-Spun | 0.025" | 667 | 9.0 | 540 | 1.9 |
| 38543-09-5 | 230° C./2 hr; 270° C./2 hr | (17.1) | 645 | 17.6 | 562 | 2.8 |
| 38538-20-7 | As-Spun | 0.025" | 868 | 8.8 | 486 | 2.1 |
| 38543-09-6 | 230° C./2 hr; 270° C./2 hr | (17.1) | 866 | 14.2 | 528 | 2.6 |

Example 4

Examples 1 and 2 were repeated in this Example 4 except that the thermotropic polyesteramide was employed in this Example 4. A HNA/AA/TA polyesteramide was used in Example 4 was sold under the tradename of "VECTRA™ B" (Ticona LLC, Summit, N.J.). The Table IV-A summarizes the as-spun and heat-treated properties of the high denier single filaments formed from this polymer.

TABLE IV-A

| Sample Number | Heat Treatment Condition | Orifice Size (Draw-down) | Den. (g) | Ten. (gpd) | Mod. (gpd) | Elong. (%) |
|---|---|---|---|---|---|---|
| 38445-44-2 | As-Spun | 0.015" | 213 | 9.5 | 698 | 1.80 |
| 38543-06-1 | 2 hr Preheat @ 230° C., 2 hr hold @ 270° C. | 0.015" | 211 | 11.1 | 676 | 1.92 |
| 38543-06-3 | 2 hr Preheat @ 230° C., 2 hr hold @ 270° C. | 0.015" | 208 | 16.8 | 697 | 2.60 |
| 38543-06-5 | 2 hr Preheat @ 230° C., 2 hr hold @ 270° C. | 0.015" | 208 | 21.6 | 710 | 3.00 |
| 38445-44-4 | As-Spun | 0.025" | 235 | 9.4 | 705 | 1.78 |
| 38543-06-2 | 2 hr Preheat @ 230° C., 2 hr hold @ 270° C. | 0.025" | 228 | 11.0 | 680 | 1.89 |
| 38543-06-4 | 2 hr Preheat @ 230° C., 2 hr hold @ 270° C. | 0.025" | 228 | 17.1 | 702 | 2.59 |
| 38543-06-6 | 2 hr Preheat @ 230° C., 2 hr hold @ 270° C. | 0.025" | 232 | 20.8 | 698 | 2.97 |

A few of the filament samples extruded from VECTRA™ B were also heat treated under optimal temperature and time conditions. The results of which are listed in Table IV-B

TABLE IV-B

| Sample Number | Heat Treatment Condition | Orifice Size (Draw-down) | Den. (g) | Ten. (gpd) | Mod. (gpd) | Elong. (%) |
|---|---|---|---|---|---|---|
| 38445-44-2 | As-Spun | 0.015" | 213 | 9.5 | 698 | 1.80 |
| 38543-10-1 | 260° C./1 hr; 290° C./2 hr; 300° C./2 hr | 0.015" | 207 | 15.4 | 676 | 2.4 |
| 38543-10-2 | 260° C./1 hr; 280° C./2 hr; 300° C./2 hr | 0.015" | 204 | 24.9 | 705 | 3.6 |
| 38543-10-3 | 260° C./1 hr; 270° C./2 hr; 290° C./2 hr | 0.015" | 206 | 20.1 | 709 | 3.0 |
| 38543-10-4 | 260° C./1 hr; 250° C./2 hr; 280° C./2 hr | 0.015" | 210 | 7.7 | 717 | 1.3 |
| 38543-10-5 | 230° C./2 hr; 270° C./18 hr | 0.015" | 212 | 17.7 | 739 | 2.6 |
| 38445-44-4 | As-Spun | 0.025" | 235 | 9.4 | 705 | 1.78 |
| 38543-10-6 | 230° C./2 hr; 270° C./18 hr | 0.015" | 230 | 18.6 | 755 | 2.6 |

Example 5

Examples 1 and 2 were repeated in this Example 5 except that the thermotropic polyesteramide was employed in this Example 5. The polyesteramide used in this Example comprises HBA, HNA, TA, BP and AA units, and is sold under the tradename of "VECTRA™ Ei" (Ticona LLC, Summit, N.J.). Table V summarizes the as-spun and heat-treated properties of the high denier single filaments formed from this polymer.

TABLE V

| Sample Number | Heat Treatment Condition | Orifice Size (Draw-down) | Denier (g) | Tenacity (gpd) | Modulus (gpd) | Elongation (%) |
|---|---|---|---|---|---|---|
| 38445-49-8 | As-Spun | 0.015" (6.2) | 219 | 7.0 | 576 | 1.30 |
| 38543-07-1 | No Preheat 2 hr @ 300° C. | 0.015" (6.2) | 214 | 21.7 | 819 | 2.6 |
| 38543-07-3 | No Preheat 6 hr @ 300° C. | 0.015" (6.2) | 214 | 23.5 | 837 | 2.5 |

TABLE V-continued

| Sample Number | Heat Treatment Condition | Orifice Size (Draw-down) | Denier (g) | Tenacity (gpd) | Modulus (gpd) | Elongation (%) |
|---|---|---|---|---|---|---|
| 38543-07-5 | No Preheat 10 hr @ 300° C. | 0.015" (6.2) | 210 | 23.6 | 857 | 2.5 |
| 38538-01-1 | As-Spun | 0.025" (17.1) | 227 | 6.6 | 608 | 1.15 |
| 38543-07-2 | No Preheat 2 hr @ 300° C. | 0.025" (17.1) | 216 | 19.8 | 838 | 2.2 |
| 38543-07-4 | No Preheat 6 hr @ 300° C. | 0.025" (17.1) | 222 | 21.2 | 856 | 2.2 |
| 38543-07-6 | No Preheat 10 hr @ 300° C. | 0.025" (17.1) | 230 | 21.4 | 841 | 2.3 |

Example 6

Examples 1 and 2 were repeated in this Example 6 except that the thermotropic polyesteramide was employed in this Example 6. The polyesteramide used in this Example comprises HBA, HNA, TA, BP and AA units, and is sold under the tradename of "VECTRA™ L" (Ticona LLC, Summit, N.J.). Table VI summarizes the as-spun and heat-treated properties of the high denier single filaments formed from this polymer.

TABLE VI

| Sample No. | Heat Treatment Condition | Orifice Size (Draw-down) | Den. (g) | Ten. (gpd) | Mod. (gpd) | Elong. (%) |
|---|---|---|---|---|---|---|
| 38538-25-1 | As-Spun | 0.015" | 228 | 8.6 | 551 | 1.6 |
| 38543-11-1 | 230° C./2 hrs. 270° C./8 hrs. | 0.015" (6.2) | 223 | 20.4 | 671 | 3.0 |
| 38543-11-3 | 230° C./2 hrs. 270° C./16 hrs. | 0.015" (6.2) | 225 | 21.7 | 697 | 2.6 |
| 38543-11-5 | 300° C./8 hrs. | 0.015" (6.2) | 221 | 19.0 | 607 | 2.7 |
| 38538-26-1 | As-Spun | 0.025" (17.1) | 233 | 7.5 | 564 | 1.5 |
| 38543-11-2 | 230° C./2 hrs. 270° C./8 hrs. | 0.025" (17.1) | 227 | 17.1 | 673 | 2.4 |
| 38543-11-4 | 230° C./2 hrs. 270° C./16 hrs. | 0.025" (17.1) | 225 | 18.5 | 687 | 2.3 |
| 38543-11-6 | 300° C./8 hrs. | 0.025" (17.1) | 216 | 17.8 | 616 | 2.5 |

Example 7

In Example 7, VECTRA™ L filaments were prepared as in Example 6, except at higher denier. Draw-down was similar. Table VII summarizes the as-spun and heat-treated properties of the filament formed from this polymer.

TABLE VII

Heat Treated Properties for High Denier Vectra ™ L Monofils

| Sample No. | Heat Treatment Condition | Orifice Size (Draw-down) | Den. (g) | Ten. (gpd) | Mod. (gpd) | Elong. (%) |
|---|---|---|---|---|---|---|
| 38538-25-1 | As-Spun (Control) | 0.015" | 228 | 8.6 | 551 | 1.6 |
| 38543-11-1 | 230° C./2 hr; 270° C./8 hr | (6.2) | | | | |
| 38538-26-6 | As-Spun (Control) | 0.015" | 337 | 8.6 | 558 | 1.6 |
| 38543-00-1 | 230° C./2 hr; 270° C./8 hr | (6.2) | | | | |
| 38538-25-7 | As-Spun (Control) | 0.015" | 444 | 8.8 | 543 | 1.7 |
| 38543-00-0 | 230° C./2 hr; 270° C./8 hr | (6.2) | | | | |
| 38538-25-8 | As-Spun (Control) | 0.015" | 545 | 8.8 | 544 | 1.7 |
| 38543-00-0 | 230° C./2 hr; 270° C./8 hr | (6.2) | | | | |
| 38538-25-9 | As-Spun (Control) | 0.015" | 656 | 8.5 | 520 | 1.7 |
| 38543-00-0 | 230° C./2 hr; 270° C./8 hr | (6.2) | | | | |
| 38534-25-10 | As-Spun (Control) | 0.015" | 745 | 8.1 | 510 | 1.7 |
| 38543-00-0 | 230° C./2 hr; 270° C./8 hr | (6.2) | | | | |
| 38538-26-1 | As-Spun (Control) | 0.025" | 233 | 7.5 | 564 | 1.5 |
| 38543-00-0 | 230° C./2 hr; 270° C./8 hr. | (17.1) | 227 | 17.1 | 673 | 2.4 |
| 38538-26-6 | As-Spun (Control) | 0.025" | 350 | 7.9 | 580 | 1.5 |
| 38543-00-0 | 230° C./2 hr; 270° C./8 hr | (17.1) | | | | |

TABLE VII-continued

Heat Treated Properties for High Denier Vectra ™ L Monofils

| Sample No. | Heat Treatment Condition | Orifice Size (Draw-down) | Den. (g) | Ten. (gpd) | Mod. (gpd) | Elong. (%) |
|---|---|---|---|---|---|---|
| 38538-26-7 | As-Spun (Control) | 0.025" | 467 | 8.0 | 551 | 1.6 |
| 38543-00-0 | 230° C./2 hr; 270° C./8 hr | (17.1) | | | | |
| 38538-26-8 | As-Spun (Control) | 0.025" | 578 | 7.8 | 534 | 1.6 |
| 38543-00-0 | 230° C./2 hr; 270° C./8 hr | (17.1) | | | | |
| 38538-20-9 | As-Spun (Control) | 0.025" | 676 | 7.3 | 530 | 1.6 |
| 38543-00-0 | 230° C./2 hr; 270° C./8 hr | (17.1) | | | | |
| 38538-20-10 | As-Spun (Control) | 0.025" | 781 | 7.3 | 501 | 1.6 |
| 38543-00-0 | 230° C./2 hr; 270° C./8 hr | (17.1) | | | | |

Example 8

Example 8 demonstrates that the heat treatment of filament wound directly on-bobbin in accordance with one of the preferred embodiments of this invention.

To develop the on-bobbin heat treatment capabilities, a heat treatment setup using a canister equipped with rubber gaskets was built. A programmable forced air Precision oven with copper tubing running along the inside walls was used to heat the bobbins after it was placed and sealed in the canister. Nitrogen gas was introduced into the copper tubing at 60 to 100 SCFH, making sure that the nitrogen gas penetrates the heat treatment package. The purge gas was heated as it passed through the oven tubing. The heated nitrogen was passed into the canister and flowed from the center of the bobbin outward. The nitrogen was then exhausted out of the canister and out of the oven guaranteeing the removal of the reaction products which otherwise could inhibit the property buildup.

The heat treatment bobbins, 6-inch in diameter and about 13-inch wide, wask constructed of perforated aluminum cylinders. The outside of the cylinders were covered with fiberfrax, a porous ceramic matting, to accommodate for the shrinkage of the monofilaments during heat treatment. For safety reasons (glass particulate containment), the fiberfrax was enclosed with polybenzimidazole (PBI) socks. Based on empirical findings, a permanent layer of Vectran™ yarn wrapped on top of the PBI enclosure offered better heat treated properties. To improve package formation (slough) for the monofilament processing, aluminum flanges were also added at each end of the bobbins. For bobbin preparation, the as-spun monofilaments were wound on to the heat treatment bobbins at low tension by using a Leesona winder at 50 m/min. After heat treatment, the fiber was re-wound on to the final product spool.

For on-bobbin heat treatment, it was found that winding the fiber at low tension is essential for making high tensile properties. By using low rewind tension, low speed and fiber lubricant (finish or water), monofilaments with outstanding mechanical properties were obtained. The standard heat treatment process for monofilaments formed according to the process of this invention is shown below. The initial dwell at 230° C. was added to allow the softening point to increase and eliminate fiber tapiness.

Heat Treatment Cycle:

(1)—Fast ramp to 230° C.

(2)—Dwell @230° C. for two hours (3)—Ramp @15° C./hr. to 270° C.

(4)—Dwell @270° C. for 8 hours (5)—Cool down to 100° C. before opening oven.

Monofilaments of VECTRA A were spun at 300 n/min and an appropriate draw-down to make a 220 denier. For physical property enhancement, the filaments were heat treated on the bobbin to make continuous heat treated monofilaments. Low tension during winding and rewinding is very important in the determination of the final properties. For this experiment, approximately 10 grams of tension was considered as critical during winding on to the heat treatment bobbins in order to achieve optimum properties while making a neat bobbin that can be heat treated and unwound without any difficulty. Tensions lower than 10 grams produced bobbins in which the fiber was falling off the bobbin and were difficult to unwound. The physical properties of samples rewound with 10 grams of tension @50 m/m is as follows: Tenacity=25.89 g/d; Elongation=3.28% and Modulus=660.1 g/d.

Example 9

Example 8 was repeated in Example 9 with the exception that the increased rewound tension of 20 grams was employed. The physical properties of the heat treated monofilament are as follows:

Tenacity=18.03 g/d; Elongation=2.50% and Modulus=650.8 g/d.

Example 10

Example 8 was repeated in this Example 10 with the exception that two as-spun monofilament samples were taken-up directly (during spinning at 300 m/min.) on to the heat treatment bobbins. The spinline tensions were measured as 10 and 20 grams with the physical properties shown below.

Sample No. 1: Sample as-spun to Leesona @300 m/m and 10 grams of tension:

Tenacity=20.3 g/d; Elongation=2.9%; Modulus=663 g/d

Sample No. 2: Sample as-spun to Leesona @300 m/m and 20 grams of tension:

Tenacity=15.6 g/d; Elongation=2.2%; Modulus=652 g/d

Examples 11

Comparison with a Conventional Process

Examples 1 and 2 were repeated in this Example 11, except that the high denier VECTRA™ A polymer monofilaments were extruded using a water bath as the quench system. The extruded monofilaments were about 200 denier and were heat treated using the same system and conditions as Example 2. The results in the following Table VIII, summarizing the as-spun and heat-treated properties of the filaments, clearly indicate that the water quenched monofilaments have inferior properties relative to those shown in Table II.

TABLE VIII

| Sample No. | Heat Treatment Condition | Denier (g) | Tenacity (gpd) | Mod. (gpd) | Elong. (%) |
|---|---|---|---|---|---|
| 38479-01-1 | Control, as-spun | 221 | 6.7 | 502 | 1.58 |
| 38543-08-1 | 2 hr Preheat @ 230° C. 2 hr hold @ 270° C. | 218 | 12.5 | 588 | 2.21 |
| 38543-08-2 | 2 hr Preheat @ 230° C. 2 hr hold @ 270° C. | 220 | 112.6 | 530 | 2.27 |

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

I claim:

1. A process for forming an as-spun filament of a thermotropic liquid crystalline polymer having the following properties:

(i) denier of at least about 50 denier per filament;

(ii) tenacity of at least about 8 grams per denier;

(iii) modulus of at least about 450 grams per denier; and (iv) elongation of at least about 2 percent;

said process comprising the steps of:

(a) heating a thermotropic liquid crystalline polymer to a temperature of at least about 15° C. above its melting transition to form a fluid stream of said thermotropic polymer;

(b) passing said stream through a heated extrusion chamber, wherein said chamber is disposed with a suitable cylindrical orifice to form the filament of said polymer, and wherein said cylindrical orifice has an aspect ratio of length to diameter (L/D) greater than about 1 and less than about 15; and (c) winding said filament at a take-up speed of at least about 200 meters per minute and draw-down (DD) ratio of at least about 4; and with the proviso that when L/D is between 0 to 2, the DD is at least 4 so as to form the filament of essentially uniform molecular orientation across its cross-section and having a denier of at least about 50 denier per filament.

2. The process as set forth in claim 1, wherein said thermotropic liquid crystalline polymer is selected from the group consisting of wholly aromatic polyesters, aromatic-aliphatic polyesters, aromatic polyazomethines, aromatic polyesteramides, aromatic polyamides, and aromatic polyester-carbonates.

3. The process as set forth in claim 1, wherein said thermotropic liquid crystalline polymer is a wholly aromatic polyester.

4. The process as set forth in claim 3, wherein said polyester comprises a melt processable wholly aromatic polyester capable of forming an anisotropic melt phase at a temperature below approximately 350° C. consisting essentially of the recurring moieties I and II wherein:

I is

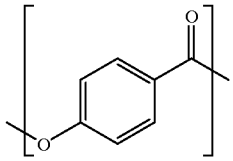

and

II is

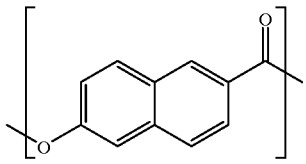

wherein said polyester comprises about 10 to about 90 mole percent of moiety I, and about 10 to about 90 mole percent of moiety II.

5. The process as set forth in claim 3, wherein said polyester comprises a melt processable wholly aromatic polyester capable of forming an anisotropic melt phase at a temperature below approximately 400° C. consisting essentially of the recurring moieties I, II, III, and VII wherein:

I is

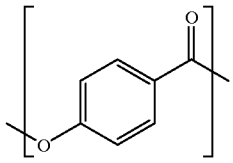

II is

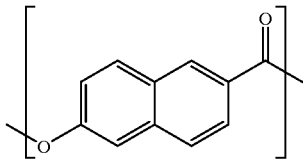

III is

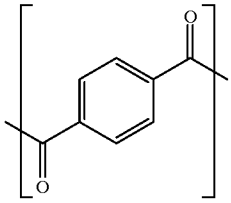

and

VII is

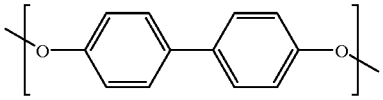

wherein said polyester comprises about 40 to about 70 mole percent of moiety I, about 1 to about 20 mole percent of moiety II, and about 14.5 to about 30 mole percent each of moieties III and VII.

6. The process as set forth in claim 1, wherein said thermotropic liquid crystalline polymer is a wholly aromatic polyesteramide.

7. The process as set forth in claim 6, wherein said polyesteramide comprises a melt processable wholly aromatic polyesteramide capable of forming an anisotropic melt phase at a temperature below approximately 360° C. consisting essentially of the recurring moieties II, [I,] *III* and VI wherein:

II is

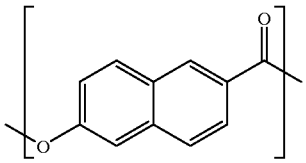

[I] *III* is

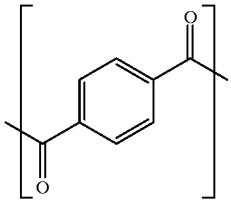

and

VI is

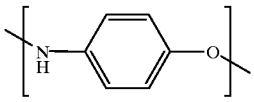

wherein said polyesteramide comprises about 40 to about 70 mole percent of moiety II, *and* about 15 to about 30 mole percent each of moieties [I,] *III* and VI.

8. The process as set forth in claim 6, wherein said polyesteramide comprises a melt processable wholly aromatic polyesteramide capable of forming an anisotropic melt phase at a temperature below approximately 380° C. consisting essentially of the recurring moieties I, II, III, VII and VI wherein:

I is

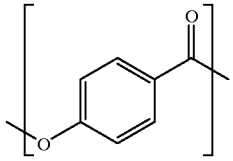

II is

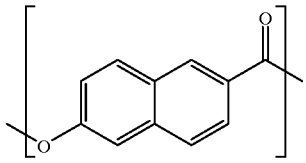

III is

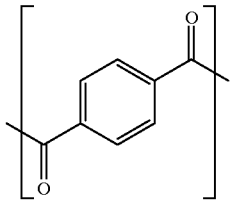

VII is

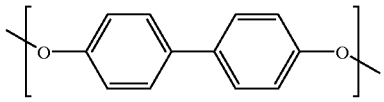

and

VI is

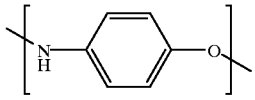

wherein said polyesteramide comprises about 40 to about 70 mole percent of moiety I, about 1 to about 20 mole percent of moiety II, about 14.5 to about 30 mole percent of moiety III, about 7 to about 27.5 mole percent of moiety VII, and about 2.5 to about 7.5 mole percent of moiety VI.

9. The process as set forth in claim 6, wherein said polyesteramide comprises a melt processable wholly aromatic polyesteramide capable of forming an anisotropic melt phase at a temperature below approximately 350° C. consisting essentially of the recurring moieties I, II, III, IV, V, and VI wherein:

I is

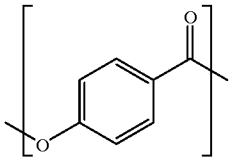

II is

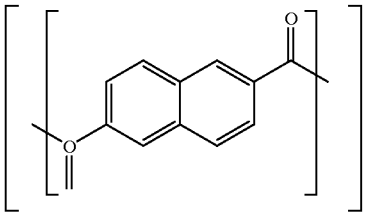

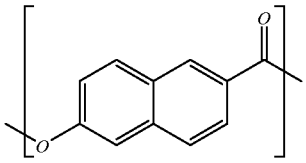

III is

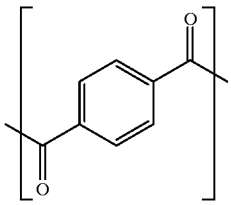

IV is

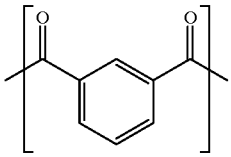

V is

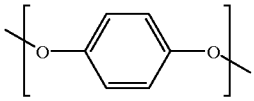

and

VI *is*

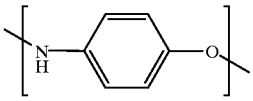

wherein said polyesteramide comprises about 40 to about 70 mole percent of moiety I, about 10 to about 20 mole percent of moiety II, about 2.5 to about 20 mole percent of moiety III, about 0 to about 3 mole percent of moiety IV, about 12.5 to about 27.5 mole percent of moiety V and about 2.5 to about 7.5 mole percent of moiety VI.

10. The process as set forth in claim 1, wherein said thermotropic liquid crystalline polymer is heated to a temperature of from about 20° C. to about 50° C. above its melting transition.

11. The process as set forth in claim 1, wherein said aspect ratio (L/D) is from about 1 to about 10.

12. The process as set forth in claim 1, wherein said aspect ratio (L/D) is from about 1 to about 3.

13. The process as set forth in claim 1, wherein said draw-down ratio is from about 4 to about 20.

14. The process as set forth in claim 1, wherein said draw-down ratio is from about 4 to about 15.

15. The process as set forth in claim 1, wherein said filaments are a monofilament.

16. The process as set forth in claim 15, wherein denier of said filament is from about 100 to about 1000 denier per filament.

17. The process as set forth in claim 15, wherein denier of said filament is from about 150 to about 500 denier per filament.

18. The process as set forth in claim 15, wherein denier of said filament is from about 180 to about 300 denier per filament.

19. The product produced by the process of claim 1.

20. The product produced by the process of claim 4.

21. The product produced by the process of claim 5.

22. The product produced by the process of claim 7.

23. The product produced by the process of claim 8.

24. The product produced by the process of claim 9.

25. The product produced by the process of claim 17.

26. The product produced by the process of claim 18.

27. A process for forming a heat-treated filament of a thermotropic liquid crystalline polymer having the following properties:

(i) denier of at least about 50 denier per filament;

(ii) tenacity of at least about 20 grams per denier;

(iii) modulus of at least about 600 grams per denier; and (iv) elongation of at least about 3 percent;

said process comprising the steps of:

(a) heating a thermotropic liquid crystalline polymer to a temperature of about 15° C. to about 50° C. above its melting transition to form a fluid stream of said polymer;

(b) extruding said stream of polymer through a heated cylindrical spinneret having at least one extrusion capillary to form a filament, wherein said capillary has an aspect ratio of length to diameter (L/D) in the range of from about 1 to about 10;

(c) winding said filament at a take-up speed of at least about 200 meters per minute and draw-down ratio of from about 5 to about 40 so as to form a filament of essentially uniform molecular orientation across the cross-section and having a denier in the range of from about 50 to about 1000 denier per filament; and (d) heat-treating said filament at suitable temperature and pressure conditions for a sufficient period of time, optionally in the presence of an inert atmosphere, to form the heat-treated filament.

28. The process as set forth in claim 27, wherein said thermotropic liquid crystalline polymer is selected from the group consisting of:

(i) a melt processable wholly aromatic polyester capable of forming an anisotropic melt phase at a temperature below approximately 350° C. consisting essentially of the recurring moieties I and II wherein:

I is

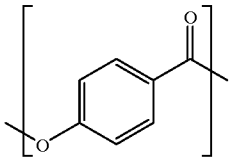

and

II is

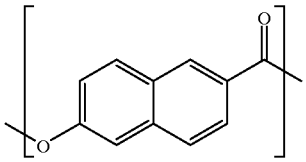

wherein said polyester comprises about 10 to about 90 mole percent of moiety I, and about 10 to about 90 mole percent of moiety II;

(ii) a melt processable wholly aromatic polyester capable of forming an anisotropic melt phase at a temperature below approximately 400° C. consisting essentially of the recurring moieties I, II, III, and VII wherein:

I is

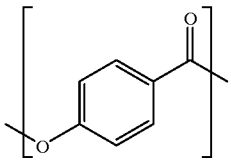

II is

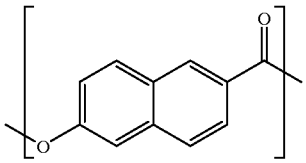

III is

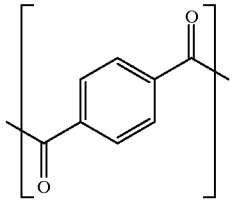

and

VII is

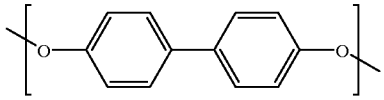

wherein said polyester comprises about 40 to about 70 mole percent of moiety I, about 1 to about 20 mole percent of moiety II, and about 14.5 to about 30 mole percent each of moieties III and VII;

(iii) a melt processable wholly aromatic polyesteramide capable of forming an anisotropic melt phase at a temperature below approximately 360° C. consisting essentially of the recurring moieties II, [I,] *III* and VI wherein:

II is

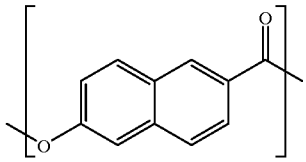

[I] *III* is

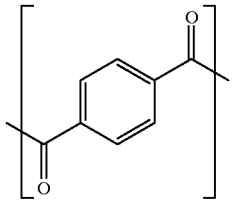

and

VI is

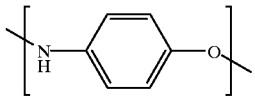

wherein said polyesteramide comprises about 40 to about 70 mole percent of moiety II, about 15 to about 30 mole percent each of moieties [I,] *III* and VI;

(iv) a melt processable wholly aromatic polyesteramide capable of forming an anisotropic melt phase at a temperature below approximately 380° C. consisting essentially of the recurring moieties I, II, III, VII and VI wherein:

I is

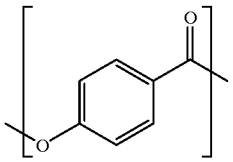

II is

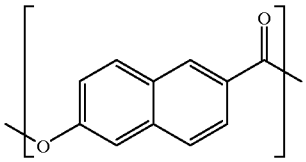

III is

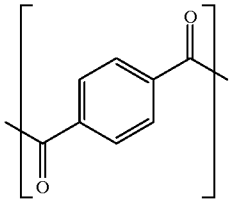

VII is

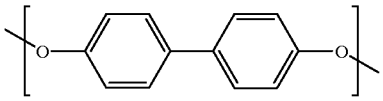

and

VI is

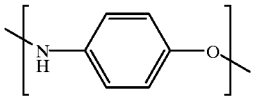

wherein said polyesteramide comprises about 40 to about 70 mole percent of moiety I, about 1 to about 20 mole percent of moiety II, about 14.5 to about 30 mole percent of moiety III, about 7 to about 27.5 mole percent of moiety VII, and about 2.5 to about 7.5 mole percent of moiety VI; and (v) a melt processable wholly aromatic polyesteramide capable of forming an anisotropic melt phase at a temperature below approximately 350° C. consisting essentially of the recurring moieties I, II, III, IV, V, and VI wherein:

I is

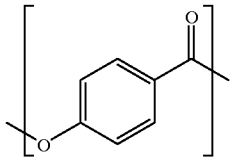

II is

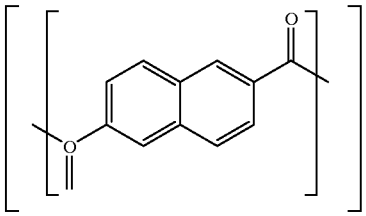

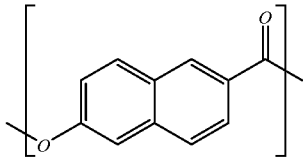

III is

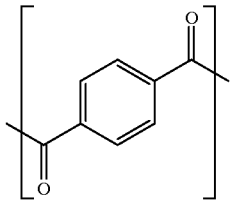

IV is

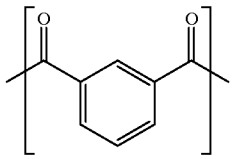

V is

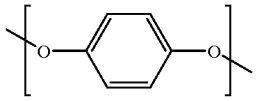

and

VI is

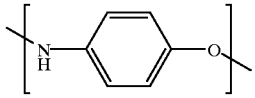

wherein said polyesteramide comprises about 40 to about 70 mole percent of moiety I, about 10 to about 20 mole percent of moiety II, about 2.5 to about 20 mole percent of moiety III, about 0 to about 3 mole percent of moiety IV, about 12.5 to about 27.5 mole percent of moiety V and about 2.5 to about 7.5 mole percent of moiety VI.

29. The process as set forth in claim 27, wherein said aspect ratio (L/D) is from about 1 to about 3.

30. The process as set forth in claim 27, wherein said heat treatment in step (d) is carried out in stages at a final temperature of about 10° C. to about 15° C. below the melting transition of said thermotropic liquid crystalline polymer.

31. The process as set forth in claim 27, wherein denier of said filament is from about 150 to about 500 denier per filament.

32. The process as set forth in claim 27, wherein denier of said filament is from about 180 to about 300 denier per filament.

33. The product produced by the process of claim 27.

34. The product produced by the process of claim 28.

35. The product produced by the process of claim 29.

36. The product produced by the process of claim 30.

37. The product produced by the process of claim 31.

38. An as-spun filament of a thermotropic liquid crystalline polymer having the following properties:

(a) denier of at least about 50 denier per filament;

(b) tenacity of at least about 8 grams per denier;

(c) modulus of at least about 450 grams per denier; and (d) elongation of at least about 2 percent.

39. The filament as set forth in claim 38, wherein said thermotropic liquid crystalline polymer is selected from the group consisting of:

(i) a melt processable wholly aromatic polyester capable of forming an anisotropic melt phase at a temperature below approximately 350° C. consisting essentially of the recurring moieties I and II wherein:

I is

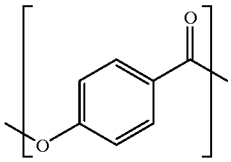

and

II is

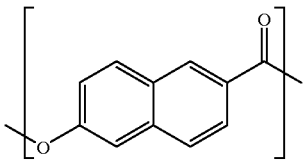

wherein said polyester comprises about 10 to about 90 mole percent of moiety I, and about 10 to about 90 mole percent of moiety II;

(ii) a melt processable wholly aromatic polyester capable of forming an anisotropic melt phase at a temperature below approximately 400° C. consisting essentially of the recurring moieties I, II, III, and VII wherein:

I is

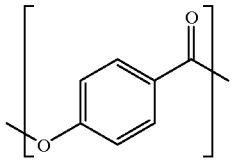

II is

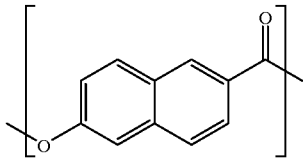

III is

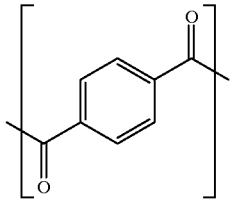

and

VII is

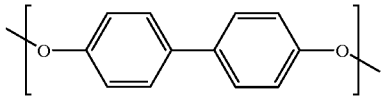

wherein said polyester comprises about 40 to about 70 mole percent of moiety I, about 1 to about 20 mole percent of moiety II, and about 14.5 to about 30 mole percent each of moieties III and VII;

(iii) a melt processable wholly aromatic polyesteramide capable of forming an anisotropic melt phase at a temperature below approximately 360° C. consisting essentially of the recurring moieties II, [I,] *III* and VI wherein:

II is

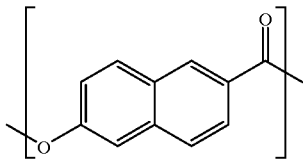

[I] *III*

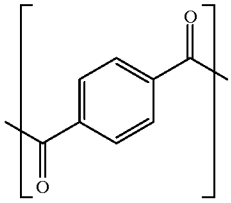

and

VI is

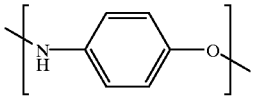

wherein said polyesteramide comprises about 40 to about 70 mole percent of moiety [I,] *II and* about 15 to about 30 mole percent each of moieties [II,] *III* and [III] *VI*;

(iv) a melt processable wholly aromatic polyesteramide capable of forming an anisotropic melt phase at a temperature below approximately 380° C. consisting essentially of the recurring moieties I, II, III, VII and VI wherein:

I is

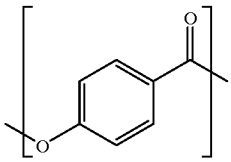

II is

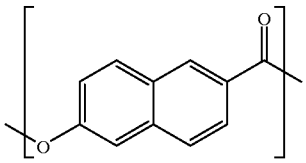

III is

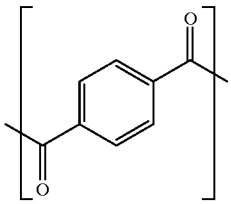

VII is

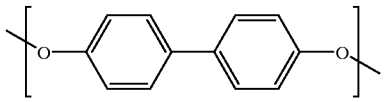

and

VI is

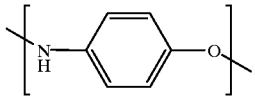

wherein said polyesteramide comprises about 40 to about 70 mole percent of moiety I, about 1 to about 20 mole percent of moiety II, about 14.5 to about 30 mole percent of moiety III, about 7 to about 27.5 mole percent of moiety VII, and about 2.5 to about 7.5 mole percent of moiety VI; and (v) a melt processable wholly aromatic polyesteramide capable of forming an anisotropic melt phase at a temperature below approximately 350° C. consisting essentially of the recurring moieties I, II, III, IV, V, and VI wherein:

I is

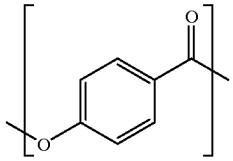

II is

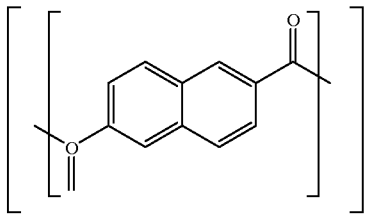

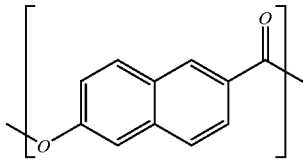

III is

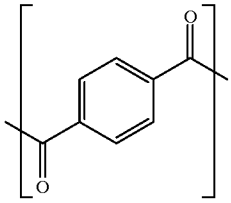

IV is

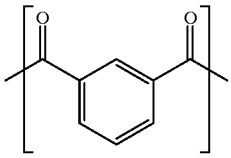

V is

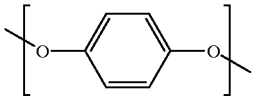

and

VI is

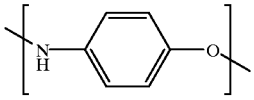

wherein said polyesteramide comprises about 40 to about 70 mole percent of moiety I, about 10 to about 20 mole percent of moiety II, about 2.5 to about 20 mole percent of moiety III, about 0 to about 3 mole percent of moiety IV, about 12.5 to about 27.5 mole percent of moiety V and about 2.5 to about 7.5 mole percent of moiety VI.

40. The filament as set forth in claim 38, wherein denier of said filament is from about 100 to about 1000 denier per filament.

41. The filament as set forth in claim 38, wherein denier of said filament is from about 150 to about 500 denier per filament.

42. The filament as set forth in claim 38, wherein denier of said filament is from about 180 to about 300 denier per filament.

43. A heat-treated filament of a thermotropic liquid crystalline polymer having the following properties:

(a) denier of at least about 50 denier per filament;

(b) tenacity of at least about 20 grams per denier;

(c) modulus of at least about 600 grams per denier; and (d) elongation of at least about 3 percent.

44. The filament as set forth in claim 43, wherein said thermotropic liquid crystalline polymer is selected from the group consisting of:

(i) a melt processable wholly aromatic polyester capable of forming an anisotropic melt phase at a temperature below approximately 350° C. consisting essentially of the recurring moieties I and II wherein:

I is

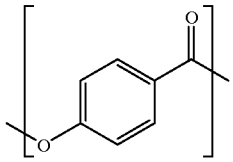

and

II is

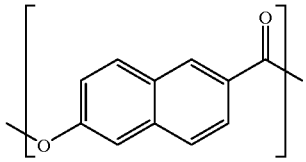

wherein said polyester comprises about 10 to about 90 mole percent of moiety I, and about 10 to about 90 mole percent of moiety II;

(ii) a melt processable wholly aromatic polyester capable of forming an anisotropic melt phase at a temperature below approximately 400° C. consisting essentially of the recurring moieties I, II, III, and VII wherein:

I is

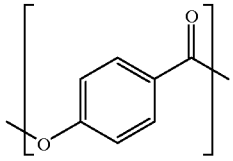

II is

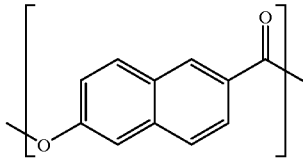

III is

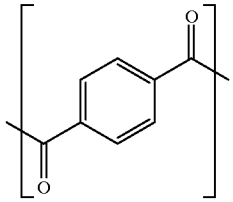

and

VI is

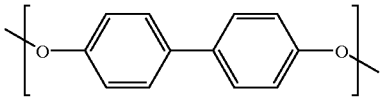

wherein said polyester comprises about 40 to about 70 mole percent of moiety I, about 1 to about 20 mole percent of moiety II, and about 14.5 to about 30 mole percent each of moieties III and VII;

(iii) a melt processable wholly aromatic polyesteramide capable of forming an anisotropic melt phase at a temperature below approximately 360° C. consisting essentially of the recurring moieties II, [I,] *III* and VI wherein:

I is

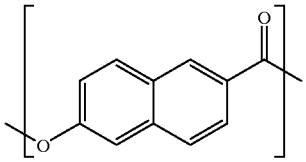

[I] *III* is

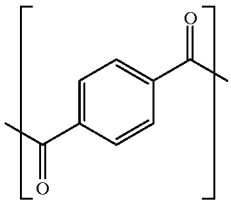

and

VI is

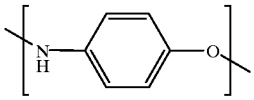

wherein said polyesteramide comprises about 40 to about 70 mole percent of moiety II, about 15 to about 30 mole percent each of moieties [I,] *III* and VI;

(iv) a melt processable wholly aromatic polyesteramide capable of forming an anisotropic melt phase at a temperature below approximately 380° C. consisting essentially of the recurring moieties I, II, III, VII and VI wherein:

I is

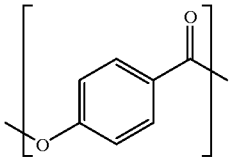

II is

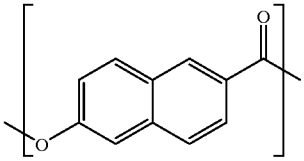

III is

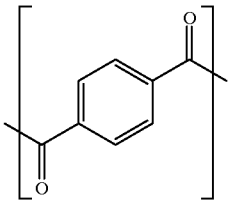

VII is

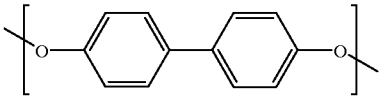

and

VI is

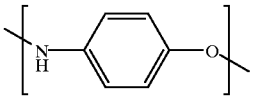

wherein said polyesteramide comprises about 40 to about 70 mole percent of moiety I, about 1 to about 20 mole percent of moiety II, about 14.5 to about 30 mole percent of moiety III, about 7 to about 27.5 mole percent of moiety VII, and about 2.5 to about 7.5 mole percent of moiety VI; and (v) a melt processable wholly aromatic polyesteramide capable of forming an anisotropic melt phase at a temperature below approximately 350° C. consisting essentially of the recurring moieties I, II, III, IV, V, and VI wherein:

I is

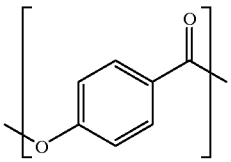

II is

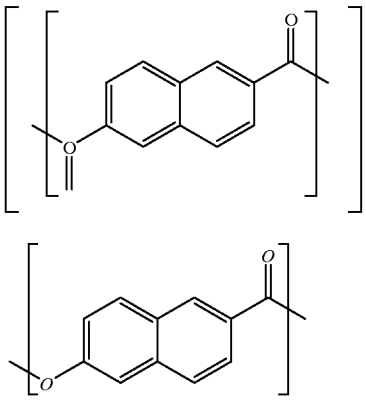

III is

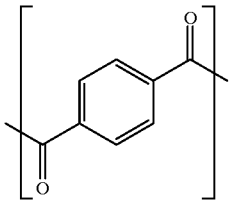

IV is

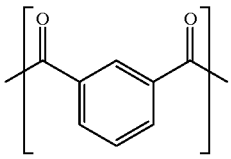

V is

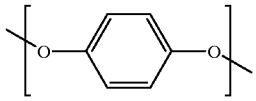

and

VI is

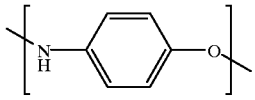

wherein said polyesteramide comprises about 40 to about 70 mole percent of moiety I, about 10 to about 20 mole percent of moiety II, about 2.5 to about 20 mole percent of moiety III, about 0 to about 3 mole percent of moiety IV, about 12.5 to about 27.5 mole percent of moiety V and about 2.5 to about 7.5 mole percent of moiety VI.

45. The filament as set forth in claim 43, wherein denier of said filament is from about 100 to about 1000 denier per filament.

46. The filament as set forth in claim 43, wherein denier of said filament is from about 150 to about 500 denier per filament.

47. The filament as set forth in claim 43, wherein denier of said filament is from about 180 to about 300 denier per filament.

* * * * *